United States Patent
Noori et al.

(10) Patent No.: US 9,913,352 B2
(45) Date of Patent: Mar. 6, 2018

(54) SYSTEM AND METHOD FOR LIGHT SOCKET ADAPTATION

(71) Applicants: Atif Mohammad Noori, San Francisco, CA (US); Gordon Wai Yee Kwan, San Jose, CA (US); Kevin Rohling, San Francisco, CA (US); Kevin David Wolfe, Fairfax, VA (US); Levi Wilburn Wolfe, San Mateo, CA (US); Steve Arnold, San Francisco, CA (US)

(72) Inventors: Atif Mohammad Noori, San Francisco, CA (US); Gordon Wai Yee Kwan, San Jose, CA (US); Kevin Rohling, San Francisco, CA (US); Kevin David Wolfe, Fairfax, VA (US); Levi Wilburn Wolfe, San Mateo, CA (US); Steve Arnold, San Francisco, CA (US)

(*) Notice: Subject to any disclaimer, the term of this patent is extended or adjusted under 35 U.S.C. 154(b) by 0 days.

(21) Appl. No.: 15/349,775

(22) Filed: Nov. 11, 2016

(65) Prior Publication Data
US 2017/0127502 A1    May 4, 2017

Related U.S. Application Data

(63) Continuation of application No. 14/621,235, filed on Feb. 12, 2015, now Pat. No. 9,526,153.
(Continued)

(51) Int. Cl.
H05B 33/08 (2006.01)
H05B 37/02 (2006.01)
(Continued)

(52) U.S. Cl.
CPC ........ *H05B 37/0272* (2013.01); *F21V 23/02* (2013.01); *F21V 23/0435* (2013.01);
(Continued)

(58) Field of Classification Search
CPC . H05B 37/0272; F21V 23/02; F21V 23/0435; F21V 23/045; F21V 23/06;
(Continued)

(56) References Cited

U.S. PATENT DOCUMENTS

2013/0293112 A1* 11/2013 Reed .................. H05B 37/0272
                                                              315/131
2015/0130359 A1* 5/2015 Bosua ................ H05B 37/0245
                                                              315/160
(Continued)

*Primary Examiner* — Daniel D Chang

(57) ABSTRACT

A light socket adaptation system and method. A light socket adapter module comprises a female end designed to accept a light bulb, a male end designed to be placed in an existing light socket, WIFI transmit/receive circuitry, Bluetooth LE transmit/receive circuitry, a processor that processes instructions received via one or more of the WIFI transmit/receive circuitry and the Bluetooth LE transmit/receive circuitry, wherein the instructions are received from one or more of a remote server system and a mobile computing device, wherein the processor executes Bluetooth LE instructions to cause the light socket adapter module to detect Bluetooth LE enabled devices within a detection proximity of the light socket adapter module, and power supply control circuitry controllable by the processor, wherein the power supply control circuitry controls power supplied to a light bulb positioned in the female end of the light socket adapter module.

11 Claims, 17 Drawing Sheets

Related U.S. Application Data

(60) Provisional application No. 61/939,128, filed on Feb. 12, 2014.

(51) Int. Cl.
  *H05B 39/04* (2006.01)
  *F21V 23/06* (2006.01)
  *F21V 23/02* (2006.01)
  *F21V 23/04* (2006.01)
  *H04W 76/02* (2009.01)
  *H04W 4/00* (2018.01)
  *H04W 84/12* (2009.01)

(52) U.S. Cl.
  CPC ............. *F21V 23/06* (2013.01); *H04W 4/008* (2013.01); *H04W 76/02* (2013.01); *H05B 37/0227* (2013.01); *H04W 84/12* (2013.01)

(58) Field of Classification Search
  CPC ............. H04L 12/2818; H04L 12/2827; H04L 2012/2841; H04L 2012/285
  USPC .......................................... 315/307, 131, 297
  See application file for complete search history.

(56) References Cited

U.S. PATENT DOCUMENTS

| | | | |
|---|---|---|---|
| 2015/0189726 A1* | 7/2015 | Spira | H05B 37/0272 315/302 |
| 2015/0309548 A1* | 10/2015 | Thomas | G06F 1/266 307/38 |

* cited by examiner

SYSTEM AND METHOD FOR LIGHT SOCKET ADAPTATION

The present application is a continuation of U.S. patent application Ser. No. 14/621,235, titled "SYSTEM AND METHOD FOR LIGHT SOCKET ADAPTATION," filed Feb. 12, 2015 which claims the benefit of and priority to U.S. Provisional Application No. 61/939,128 titled "LIGHT SOCKET ADAPTER FOR INTERNET OF THINGS AND HOME AUTOMATION BACKBONE" filed on Feb. 12, 2014; the contents of both are hereby incorporated by reference herein in their entirety.

BACKGROUND OF THE INVENTION

The present invention relates generally to lighting systems and methods and more specifically to systems and methods for adapting existing light sockets for automation and remote interaction.

Every home, restaurant, hotel, or building must have lighting installed. Such lighting includes various types of light bulbs and schemes for controlling the light bulbs. The control schemes can also include some sort of automation to control lighting (on/off/dim), temperature, and power to various systems.

It is not uncommon for the existing automation in these various structures to utilize a proprietary RF protocol. The RF protocols result in limited interoperability with popular consumer electronics, as the more popular consumer electronics utilize WiFi or Bluetooth instead.

Popular consumer electronics are available that utilize Bluetooth, however a smartphone or other mobile computing device is required to act as a bridge from the consumer electronics to the Internet, either through cellular or WiFi communications.

It is within the aforementioned context that a need for the present invention has arisen. Thus, there is a need to address one or more of the foregoing disadvantages of conventional systems and methods, and the present invention meets this need.

BRIEF SUMMARY OF THE INVENTION

Various aspects of methods and systems for adapting light sockets can be found in exemplary embodiments of the present invention.

In a first embodiment, a light socket adapter module comprises a female end designed to accept a light bulb, a male end designed to be placed in an existing light socket, WIFI transmit/receive circuitry, Bluetooth LE transmit/receive circuitry, a processor that processes instructions received via one or more of the WIFI transmit/receive circuitry and the Bluetooth LE transmit/receive circuitry, wherein the instructions are received from one or more of a remote server system and a mobile computing device, wherein the processor executes Bluetooth LE software to cause the light socket adapter module to detect Bluetooth LE enabled devices within a detection proximity of the light socket adapter module, and power supply control circuitry controllable by the processor, wherein the power supply control circuitry controls power supplied to a light bulb positioned in the female end of the light socket adapter module.

With the present invention, a user can easily install an existing lightbulb into a light socket adapter module, install the combination of the light socket adapter module with the lightbulb into an existing light socket, establish communication with the light socket adapter module via WiFi and Bluetooth LE, and remotely control power supplied to the lightbulb using a mobile computing device. The light socket adapter module of the present invention is designed such that no modification to the existing light socket or light bulb is necessary, for ease of installation.

With the present invention, data collected by the light socket adapter module can be transmitted from each light socket adapter in a home or building to a remote server system through a router via WiFi. This benefit is realized by the light socket adapter module becoming a gateway, eliminating the need for a central hub that gathers data and transmits to the remote server system. Further, additional Bluetooth enabled devices in proximity to the light socket adapter can communicate data to the light socket adapter to be transmitted to the remote server system.

With the present invention, data regarding how humans or other beings move around a house or building is collected via Bluetooth LE attached to a light socket adapter module. The data can be aggregated and analyzed for a wide variety of uses.

With the present invention, a user can enter a room and be identified. This enables a change in the lighting scheme according to the user's preferences. This also enables the user to program their lights to be an alarm clock (e.g., dim the lights up slowly in the morning).

With the present invention, a user can provision WiFi for multiple Bluetooth enabled light socket adapter modules at the same time through the use of Bluetooth communication. This is in contrast to existing systems, whereby each device must be provisioned individually.

With the present invention, user experienced is far enhanced due to the light socket adapter module having both WiFi and Bluetooth communication capabilities. The combination of WiFi and Bluetooth capabilities provides contextual awareness, enhanced setup, and makes the present invention easy to use for users having a wide variety of technical aptitude.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
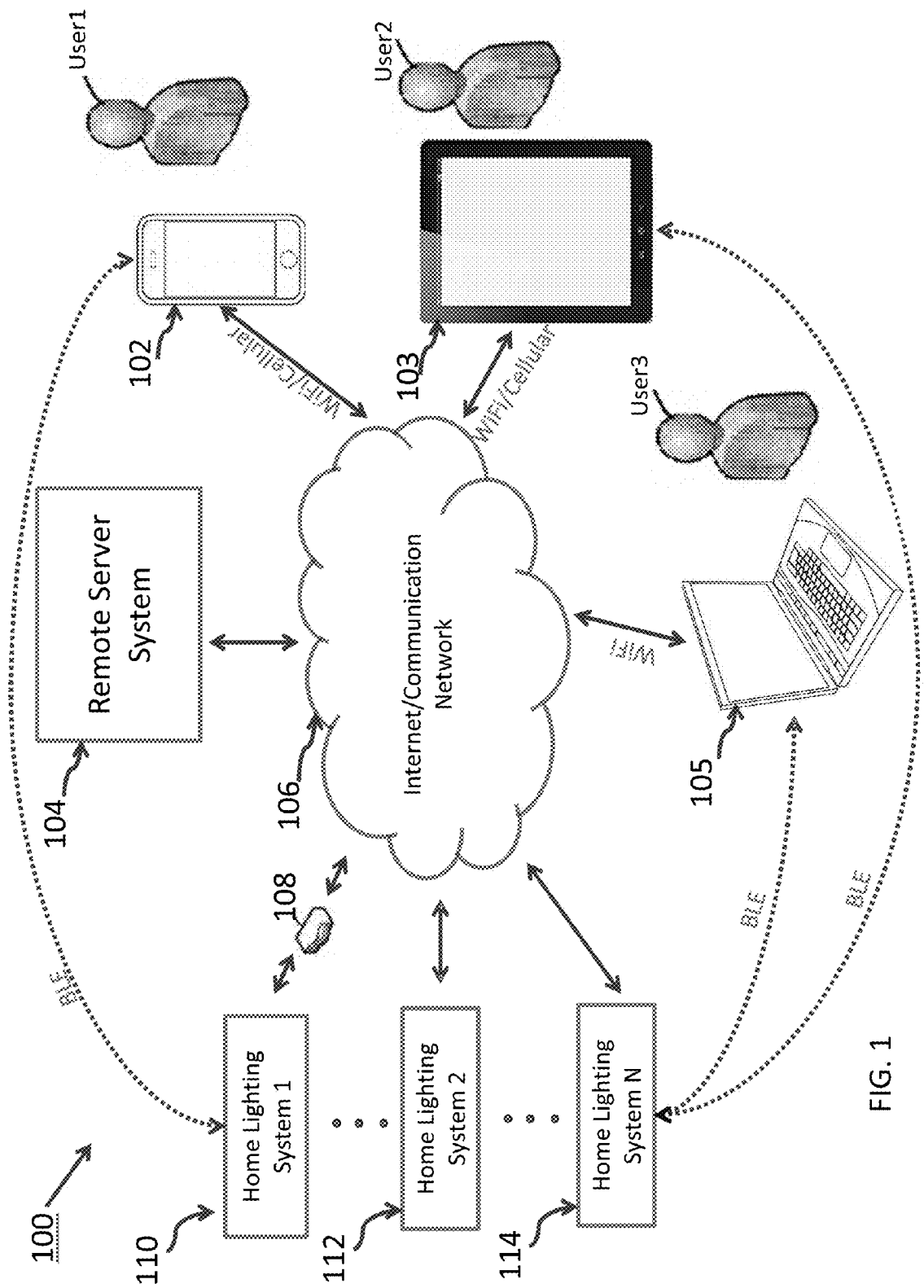
FIG. 1 illustrates a lighting system for light socket adaptation according to an exemplary embodiment of the present invention.

FIG. 1 illustrates a lighting system for light socket adaptation 100 according to an exemplary embodiment of the present invention.

In FIG. 1, lighting system 100 comprises a remote server 104 communicably coupled via Internet/communication network 106 and wireless router 108 to home lighting system 1 designated 110 Internet/communication network 106 can be any communication network that allows data to be communicated or transferred from one point to another. Such a network might be wired or wireless as deemed necessary to be consistent with the spirit and scope of the present invention Although not shown, home lighting system 110 includes at least one light bulb and a corresponding power unit for controlling the light bulb as well as a wall unit switch for manually controlling the light bulb.

In FIG. 1, using tablet 102, USER 1 can log into remote server system 104 to access home lighting system 110. Thus, USER 1 remotely located from his or her home lighting system 110 can use the remote server system 104 to access various functionalities relating to the light bulbs within home lighting system 110.

Similarly, USER 2 can also access home lighting system 2 designated 112, which is also communicably coupled to remote server system 104 via Internet/Communication network 106. Specifically, USER 2 can employ tablet 103 to access remote server system 104 via Internet/communication network 106.

USER 3 can also remotely access home lighting system N designated as 114. Specifically, USER 3 can employ laptop computer 105 to access remote server system 104 via Internet/communication network 106.

Because light socket adapter modules (not shown but described further below) of the home lighting systems (110, 112, 114) are both WiFi and Bluetooth LE enabled, devices 102, 103, 105 can also directly control the home lighting systems 110, 112, 114 via Bluetooth LE without need for WiFi or cellular communications.

Changes to light socket (110, 112, 114) settings (not limited to dim levels, proximity detection, etc.) can be pushed into Internet/communication network (106) so that it may be observed by USER (102, 103, 105) or a $3^{rd}$ party (not limited to security company, family members, etc.).

It will be appreciated that, while devices 102, 103, 105, and the mobile or input devices depicted and described herein are in the form of a smart phone, mobile computing device, laptop computer, and tablet device, any computing device having processing and communication capabilities for performing the functionalities described herein are suitable for use with the present system without departing from the scope of the invention.

USER 1, USER 2, and/or USER 3 can then perform functionalities related to each corresponding home lighting system consistent with the spirit and scope of the present invention. Although not shown, further descriptions of various embodiments of the present invention will be described with reference to the following figures.

Figure 2A:
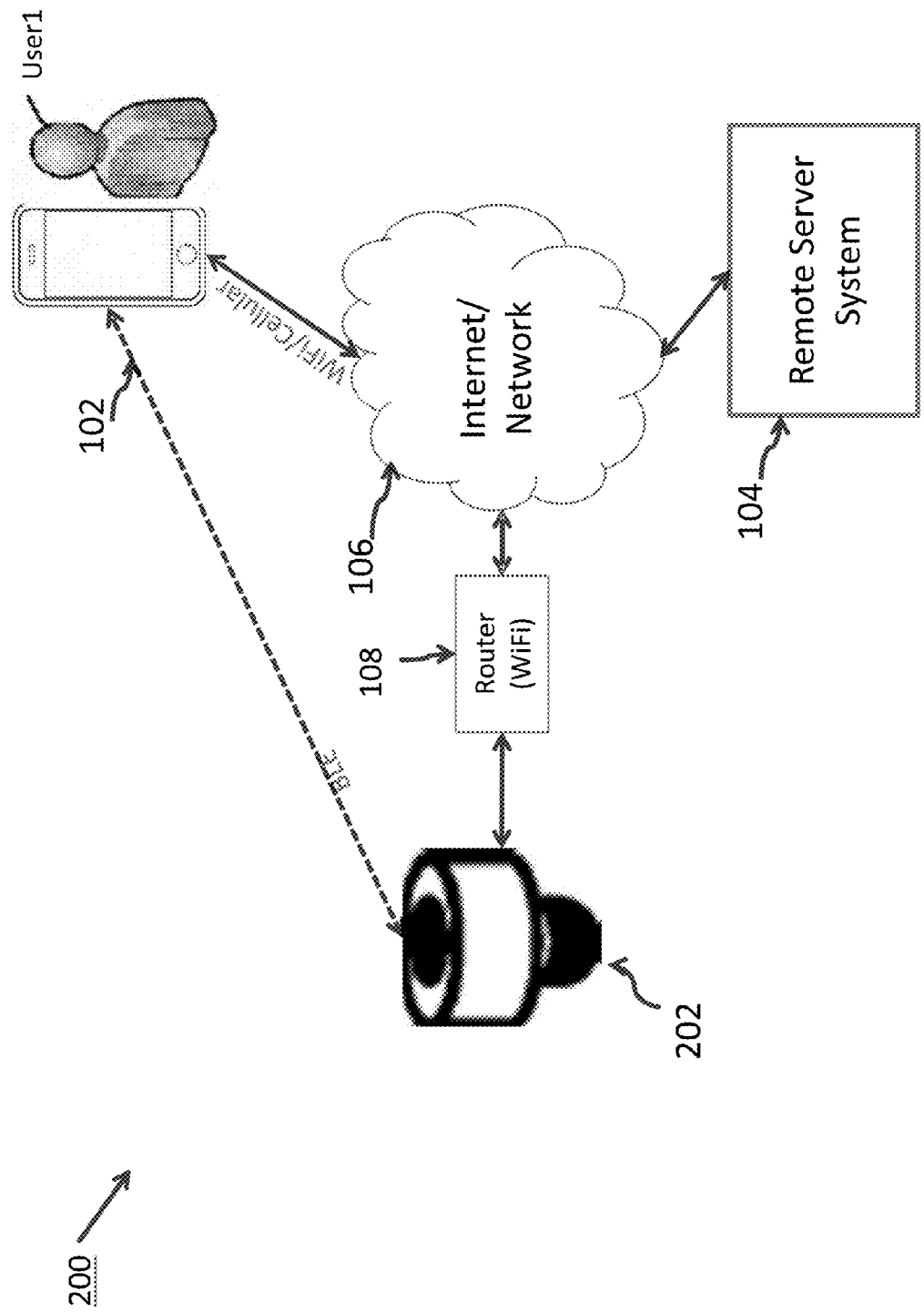
FIG. 2A illustrates a home lighting system according to an exemplary embodiment of the present invention.

FIG. 2A illustrates home lighting system 200 according to an exemplary embodiment of the present invention.

In FIG. 2A, an light socket adapter module 202 communicates directly with a mobile device 102 via a short range RF protocol including Bluetooth, Bluetooth LE (BLE), Zigbee, ANT, ANT+, NFC, 6LoWPAN, or any other protocol used for short range data communication. The light socket adapter module 202 also communicates over the Internet/Network 106 with remove server system 104 via WiFi using a router 108. According to one embodiment, light socket adapter module 202 receives instructions directly from mobile device 102. Light socket adapter module 202 can also receive instructions via WiFi from remote server system 104.

According to one embodiment, light socket adapter module 202 receives instructions from a device 102, and device 102 can receive input in the form of actuation of buttons, selection via touch screen, voice input and various gestures (e.g., shaking of the device 102, sensing a hand gesture within proximity of the device 102, etc.). Although depicted herein as a smartphone, device 102 does not necessarily have to be a smart phone in order to have enabled the above described input capabilities.

According to one embodiment, light socket adapter module 202 acts as a WiFi repeater for device 102. In this manner, light socket adapter module 202 receives information via WiFi through router 108 and transmits the data to device 102. This is particularly useful for occasions when device 102 is not within range of router 108.

Figure 2B:
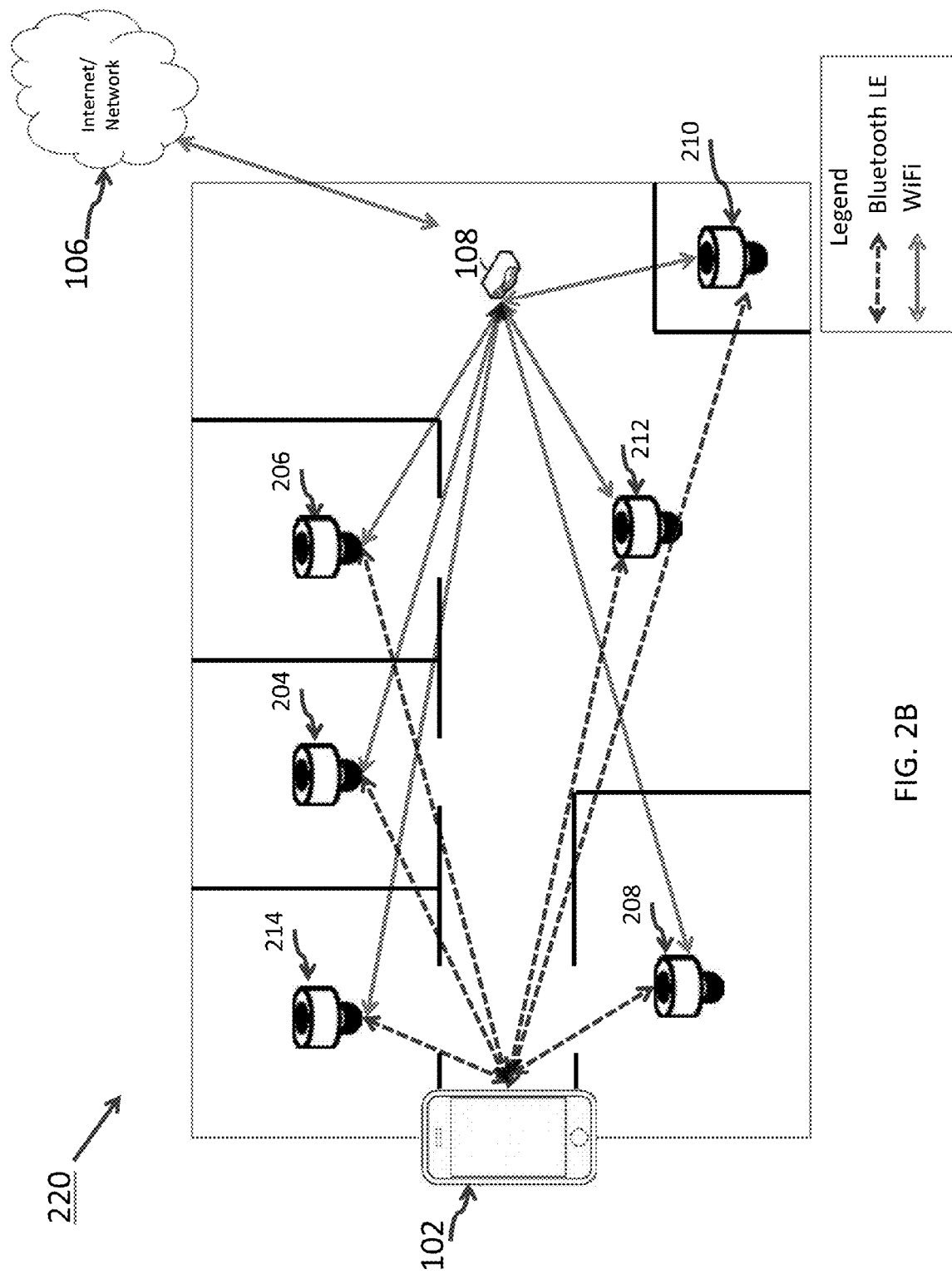
FIG. 2B illustrates a home lighting system according to an exemplary embodiment of the present invention.

FIG. 2B illustrates home lighting system 220 according to an exemplary embodiment of the present invention.

In FIG. 2B, a plurality of light socket adapter modules (204, 206, 208, 210, 212, 214) form a lighting network throughout a home or other building. Each light socket adapter modules (204, 206, 208, 210, 212, 214) communicates with a mobile input device 102 via Bluetooth LE or other short range RF protocol. Each light socket adapter module (204, 206, 208, 210, 212, 214) also communicates over Internet/network 106 WiFi through router 108.

Figure 2C:
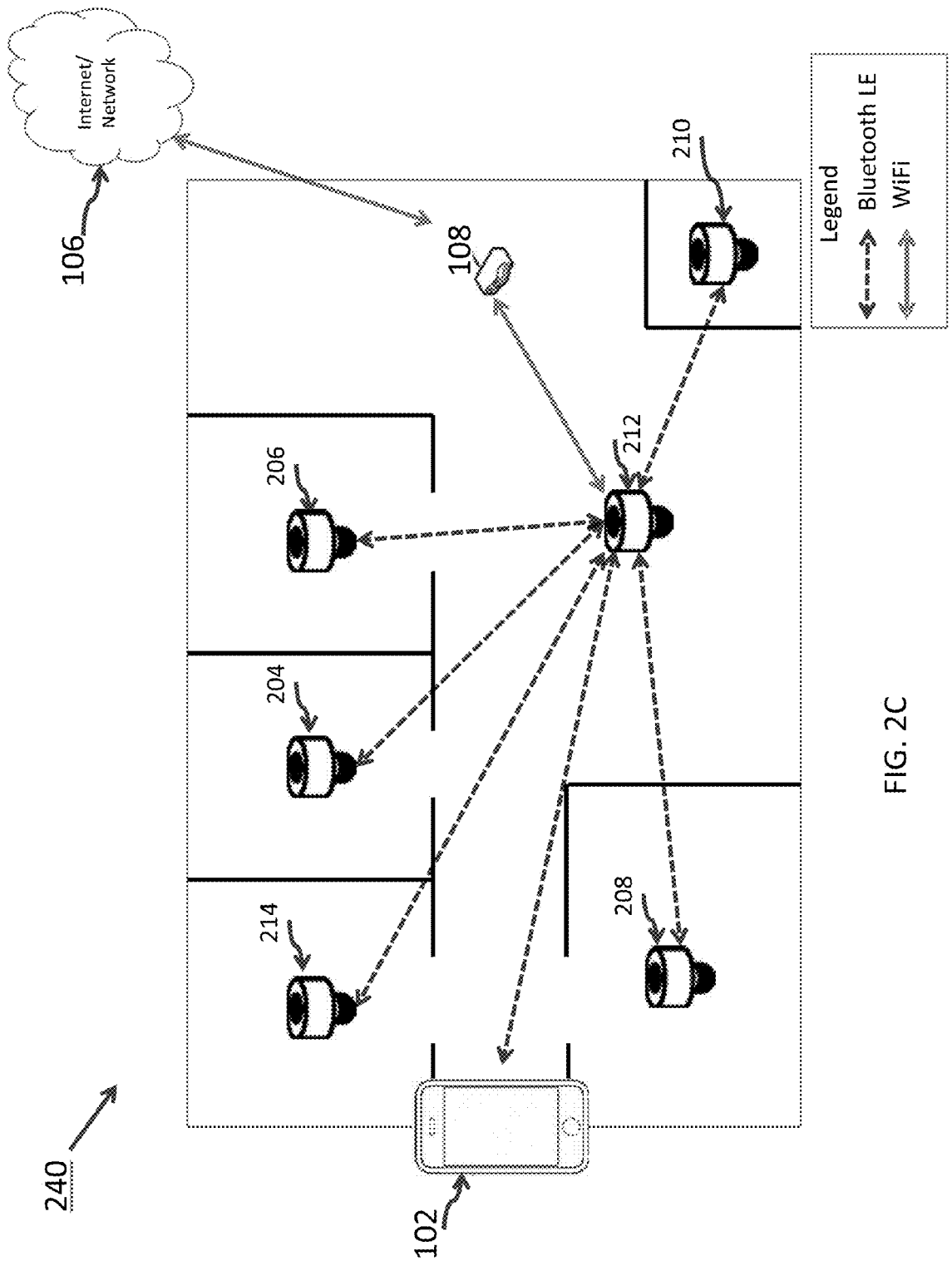
FIG. 2C illustrates a home lighting system according to an exemplary embodiment of the present invention.

FIG. 2C illustrates home lighting system 240 according to an exemplary embodiment of the present invention.

In FIG. 2B, a plurality of light socket adapter modules (204, 206, 208, 210, 212, 214) form a lighting network throughout a home or other building. However, in this embodiment, adapter modules 204, 206, 208, 210, and 214 have powered down their WiFi modules and have essentially become slave devices to master adapter module 212. Adapter module 212 communicates with mobile input device 102 via Bluetooth LE or other short range RF protocol and also communicates over Internet/network 106 WiFi through router 108. Slave adapter modules 204, 206, 208, 210, and 214 communicate with master adapter module 212 via Bluetooth LE or other short range RF protocol. Instructions for the slave adapter modules received over Internet/network 106 are related from the master module to the slave adapter modules vie Bluetooth LE.

The embodiment of FIG. 2C achieves desirable power savings due to WiFi requiring more power than Bluetooth LE. In addition, such an embodiment is appropriate in a scenario where adapter modules are in use in areas without WiFi coverage. It will be appreciated that one or more of adapter modules 204, 206, 208, 210, and 214 can be slave or master devices. The embodiment depicted in FIG. 2C illustrates a single master adapter module and all other adapter modules being slaves, however any combination of master and slave modules can exist without departing from the scope of the present invention.

Although not shown, Bluetooth LE units forward messages to each other in a mesh type network. This extends the Bluetooth range from the master unit.

It will also be appreciated that WiFi modules of adapter modules may be periodically powered down to save energy, and powered on in response to any number of triggering events (a specific user is detected, activity detected, timer expiration, instruction received, etc.).

Figure 3:
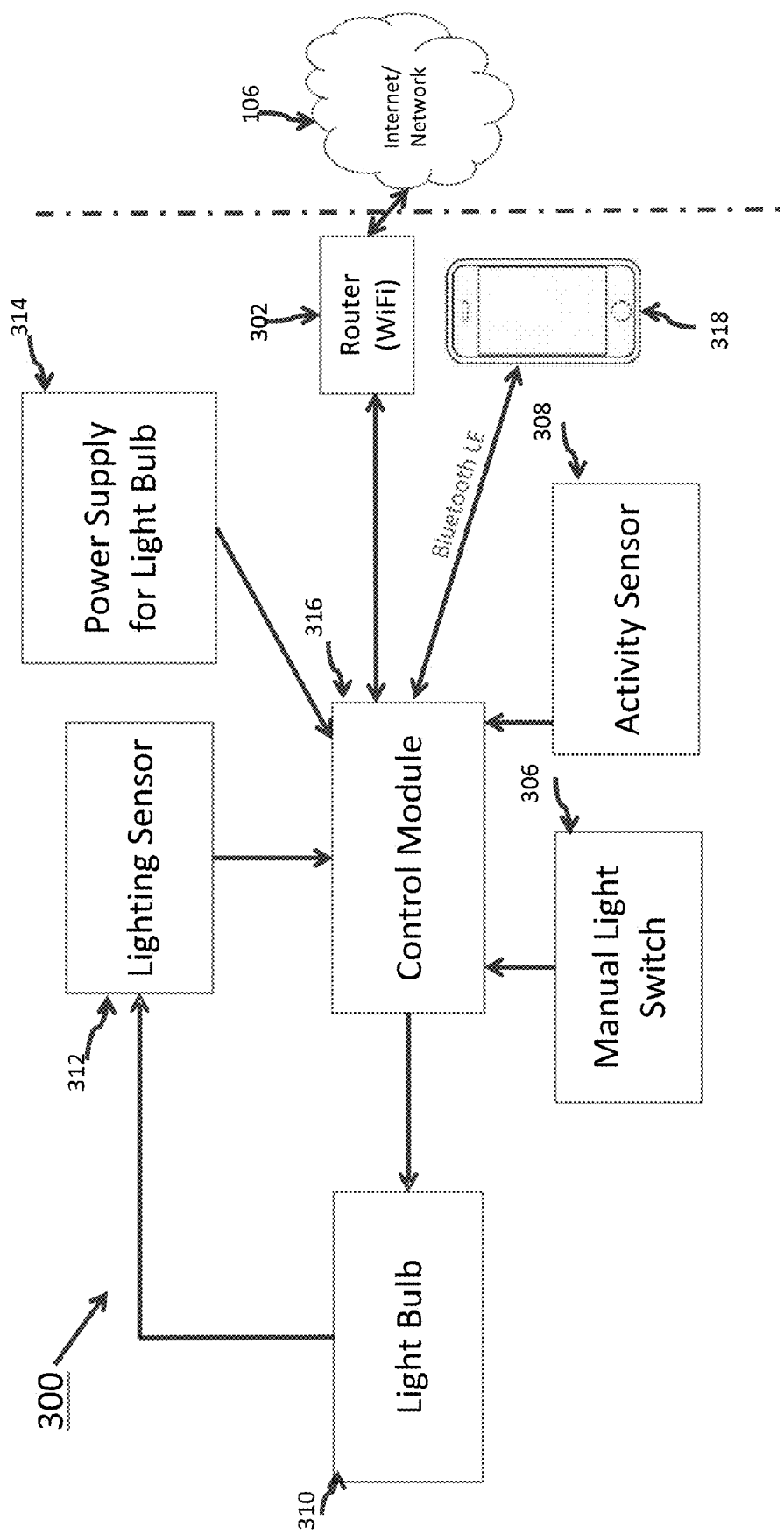
FIG. 3 illustrates a home lighting system according to an exemplary embodiment of the present invention.

FIG. 3 illustrates home lighting system 300 according to an exemplary embodiment of the present invention.

In FIG. 3, home lighting system 300 shows various exemplary components of home lighting systems 110, 112 and 114 of FIG. 1. Home lighting system 300 comprises router 302 communicably coupled to control module 316. Bluetooth enabled mobile device 318 is also communicably coupled to control module 316 via Bluetooth LE (or other short range protocol). Router 302 receives data from Internet/communication network 106 of FIG. 1. Router 302 is a WiFi router capable of receiving data from the Internet and that is compliant with 802.11 standards. Router 302, as mentioned, is capable of receiving data from Internet/communication network 106 and transmitting received data to control module 316.

Data is transferred wirelessly from router 302 or device 318 to control module 316. Control module 316 might be located within receiving distance of router 302 and/or device 318 such that both components can effectively communicate with each other. Router 302 and device 318 are also capable of receiving data from control module 306 and transferring that data via Internet/communication network 106 to the remote server system 104 of FIG. 1.

Data received by control module 316 might comprise instructions to adjust power to light bulb 310. Control module 316 executes such instructions and adjusts power to light bulb 310 accordingly.

An advantage of the present invention is that control module 316 is in an adapter module that is placed between light bulb 310 and the power supply 314 for the light bulb without the need to uninstall and replace entire lighting systems, potentially saving many homeowners substantial amounts of money as well as labor costs.

Control module 316 is also communicably coupled to lighting sensor 312 and activity sensor 308. Control module 316 can receive data from sensors 312 and 308 push such data via router 302 and Internet/communication network 106 to the remote server system 104 of FIG. 1 or push such data to device 318 via Bluetooth.

It will be appreciated that, while the embodiments described herein include lighting and activity sensors 312 and 308, respectively, any integrated peripheral device or sensor used in combination with or in place of those sensors is appropriately within the scope of the present invention. Examples of peripherals can include smart sockets, temperature sensors, moisture detectors, sound detectors, dimmers or various switches. The peripherals can be Bluetooth LE enabled.

It will be appreciated that activity sensor 308 can simply be the existing Bluetooth LE radio and antenna, and does not necessarily have to be an additional sensor attached to the adapter module.

A benefit to using Bluetooth LE over other short range RF protocols (e.g. Zigbee, Z-wave) is that it enables proximity or presence sensing. In such a situation, the identity of a user who has entered a room (or proximity of the adapter module) can be determined. The lighting scheme can subsequently be adjusted according to known preferences of the detected user. The identity of the user can be determined because the MAC address (or other unique identifier that is emitted) from their BLE detection device (smartphone, tablet, wearable fitness tracker, or other wearable) is tied to their account. This is in contrast to general motion sensors because a motion sensor simply detects motion and has no way to distinguish one user from another, or a human from an animal. The adapter module can also detect the presence of a still object, since it is detecting presence and not motion.

In one embodiment, control module 316 can be disabled such that light bulb 310 operates as if control module 316 is not present. In such a state of the system, manual light switch 306 (or other associated remote control) is fully functional. Otherwise, when control module 316 is enabled, power to the light bulb 310 is off or controlled by the control module 316 and the manual switch 306 is not functional.

In another embodiment, the control module 316 is enabled and responds to the manual switch 306 such that both are functional (i.e., a user can control lighting using control module 316 or manual switch 306).

Further description and operation of the home lighting system 300 are illustrated with reference to FIGS. 4 and 5 below.

Figure 4:
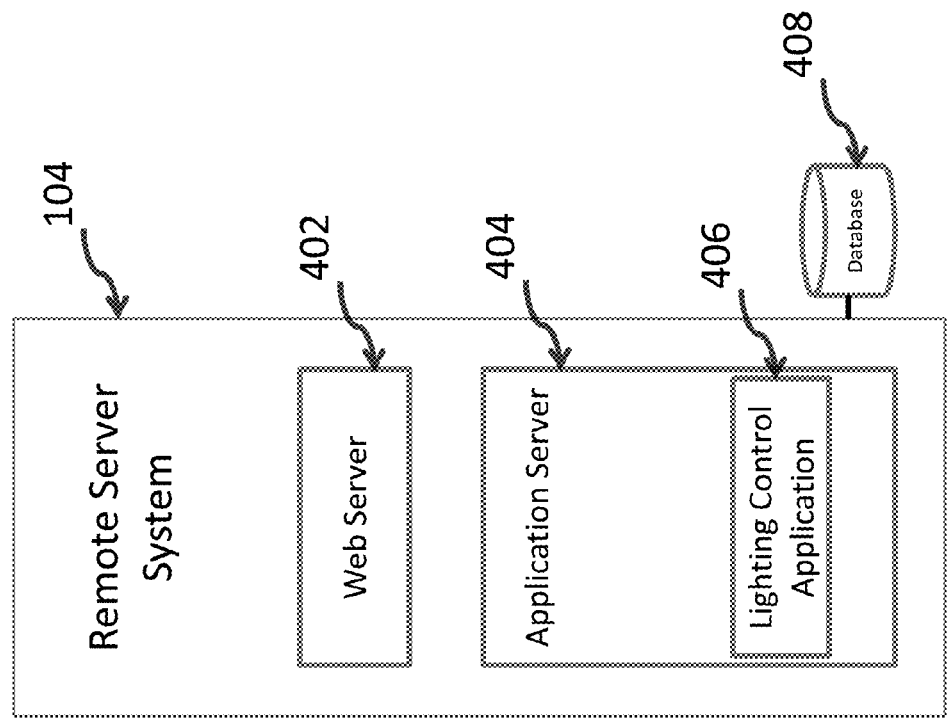
FIG. 4 illustrates a remote server system according to an exemplary embodiment of the present invention.

FIG. 4 illustrates remote server system 104 according to an exemplary embodiment of the present invention.

In FIG. 4, remote server system 104 includes web server 402 and application server 404. Web server 402 functions to serve up and host a website (not shown) that can be accessed by USER 1, USER 2 and USER 3 of FIG. 1. Among other functionalities, users can access this website to determine lighting system status information as well as issue corresponding commands to adjust power to light bulbs of remotely located lighting systems. Web server 402 can be hardware, software or a combination of both.

Application server 404 controls all software applications accessible by USER 1, USER 2 and USER 3. Users can access lighting control application 406, which comprises one or more software instructions to control the lighting within remotely located home lighting systems 110, 112, 114 of FIG. 1. Lighting control application 406 may also include one or more software instructions enabling a user to view lighting status information. Application servers 402 and 404 are communicably coupled to database 408, in which information for all registered users and their adapter modules are stored.

Figure 5:
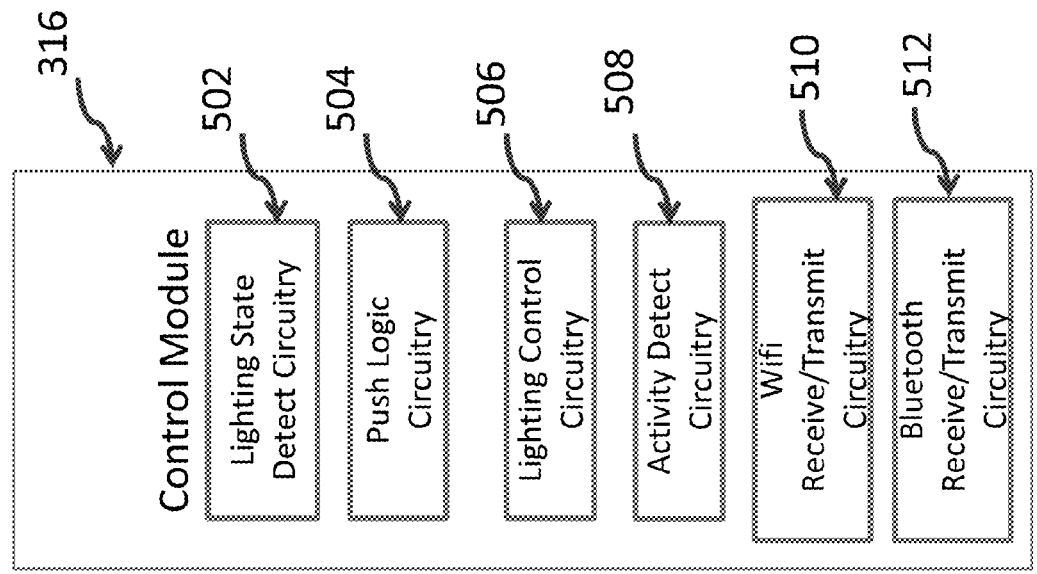
FIG. 5 illustrates a control module according to an exemplary embodiment of the present invention.

FIG. 5 illustrates control module 316 according to an exemplary embodiment of the present invention.

In FIG. 5, adapter control module 316 includes lighting state detect circuitry 502 that stores the state of lighting. This information, that is what state the light bulb is in, is typically received via lighting sensor 314. Adapter control module 316 also includes activity detect circuitry 508 that senses activity within a particular vicinity of the adapter control module 316. This information is typically received via activity sensor 308 of FIG. 3.

When a particular state or activity is detected, push logic circuitry 504 pushes lighting or activity status information to lighting application 406 automatically and based on predefined time intervals designated by the user. In one embodiment, information is pushed only if there is a status change in the lighting state or activity.

Further, one or more software code instructions for applying asynchronous polling can be employed by lighting control application 406. Asynchronous polling constantly polls (or pings) control module 316 so that when a communication error occurs during transmission, lighting control application 406 is aware of the error and users can receive correct lighting status information. An advantage of the present invention is that lighting status information is pushed (as opposed to pulling) to remote server system 104.

Although data can be pulled as well, the present invention preferably pushes lighting status information when there is change in the status of the lighting. In this manner, unlike other existing systems, users need not request lighting status information in order to receive such information. Not only does pushing avoid inundating the server with requests, users need not await responses to their status information requests as such status information is already available.

In FIG. 5, control module 316 also includes a lighting control circuitry 506 that receives instructions from USER 1, 2 or 3 to adjust power to light bulb 310. In turn, lighting control circuitry 506 interprets the user's instructions and adjusts power to light bulb 310 accordingly.

Control module 316 also includes Bluetooth (or other short range RF protocol) receive/transmit circuitry 512 and Wifi receive/transmit circuitry 510. As implied by its name, Wifi receive/transmit circuitry 510 can receive or transmit data to and from router 302 or to/from device 318 of FIG. 3. Also, Bluetooth receive/transmit circuitry 512 can receive or transmit data to and from device 318 of FIG. 3 and other Bluetooth enabled devices in proximity. Specifically, Wifi receive/transmit circuitry 510 processes remote commands received from users via Internet/Communication network 106 and router 302 before being processed at control module 316. Similarly, Bluetooth receive/transmit circuitry 510 processes remote commands received via Bluetooth from device 318 before being processed at control module 316.

Figure 6:
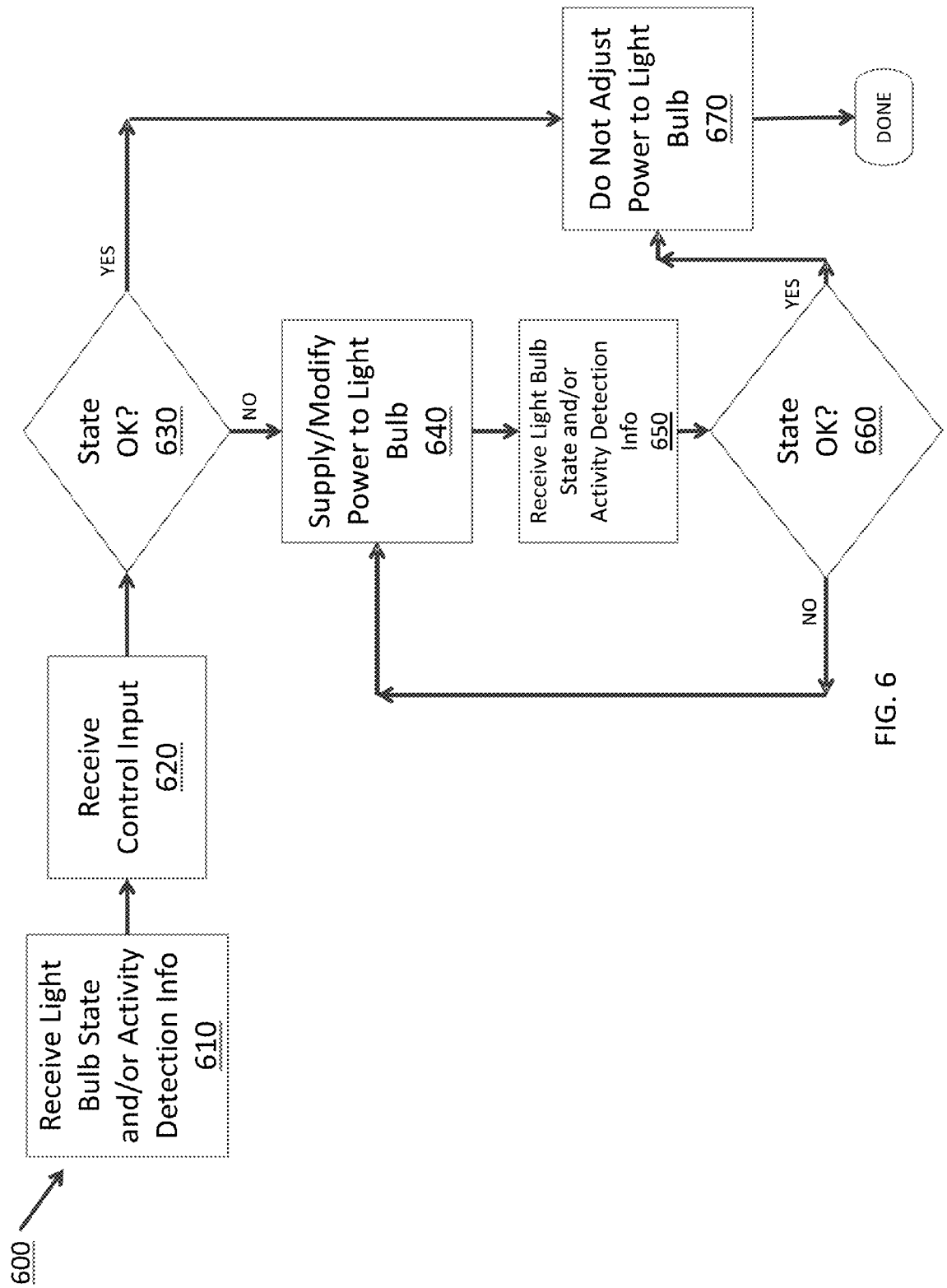
FIG. 6 illustrates control logic according to an exemplary embodiment of the present invention.

FIG. 6 illustrates control logic 600 according to an exemplary embodiment of the present invention.

In FIG. 6, a light bulb state or information regarding activity detection is received 610, as is control input 620. Control input can be a request from a remote device via remote server system, a request from a remote device via Bluetooth, or can be a manual actuation of a light bulb on/off/dim switch. If the current state of the light bulb is acceptable (e.g., the bulb is on, off, or at the correct dimming level) 630, the power to the light bulb is not adjusted 670. However, if the current state of the light bulb is not acceptable (e.g., the light bulb state does not match the desired state) 630, the power supplied to the light bulb is modified (enabled, lowered, increased) 640 to enable a change in light bulb state. Once again the light bulb state is received 650 and examined 660. If the light bulb state is now acceptable 660, the power to the light bulb is not adjusted 670. However, if the light bulb state does not match the desired state 660, power to the light bulb is again adjusted 640 to enable a change in light bulb state. One of ordinary skill in the art will appreciate that many issues can be responsible for an unsuccessful change in light bulb state, thus fail safes must be in place. Fail safes include the present second examination of light bulb state, but can also include sensors, timers, or counters to avoid multiple attempts at adjusting the power to the light bulb in the event that an undetected error has occurred.

Figure 10:
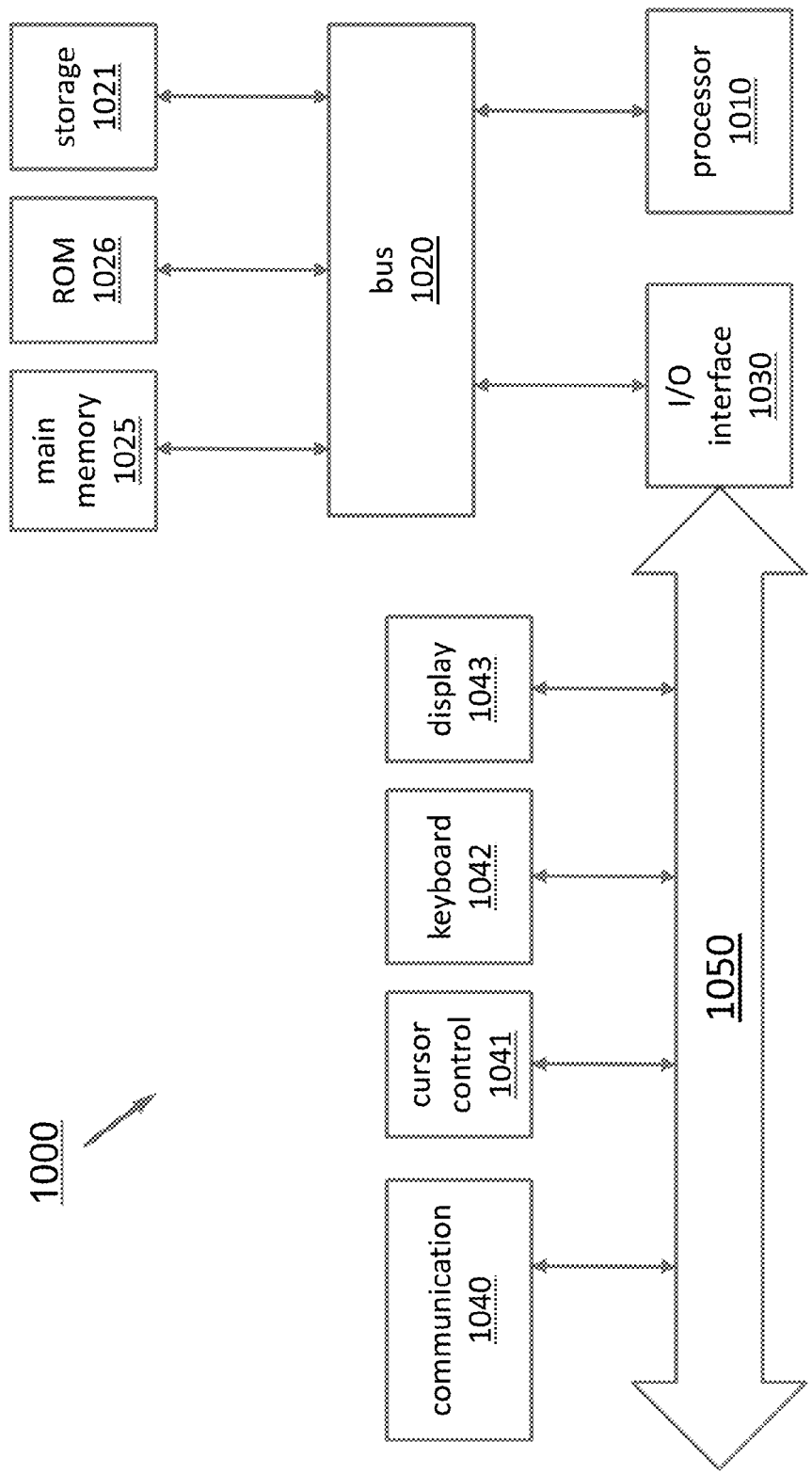
FIG. 10 illustrates an exemplary computer architecture for use with an exemplary embodiment of the present invention.
Figure 11A:
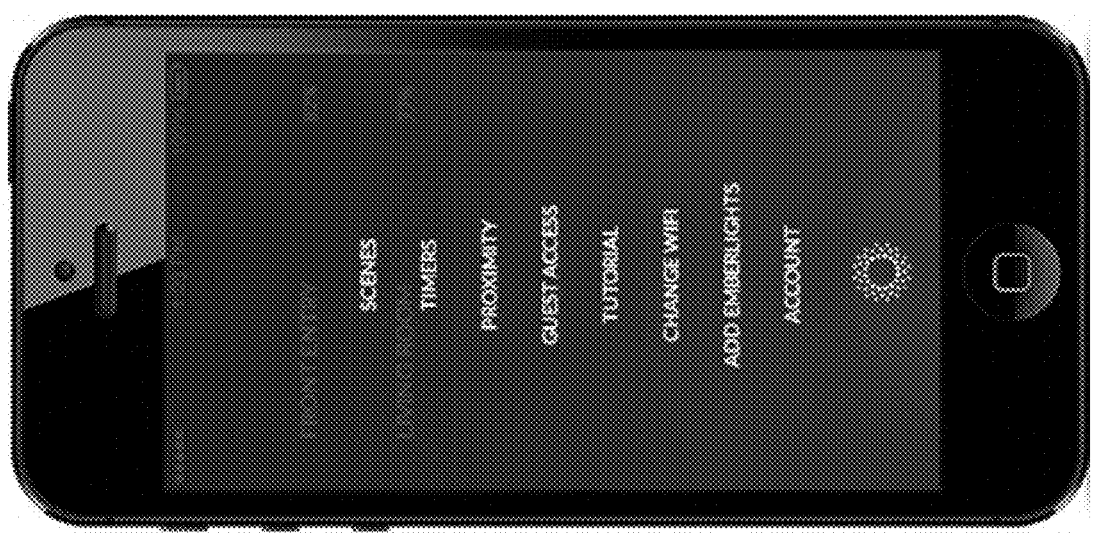
FIGS. 11A-11F illustrate exemplary user interfaces for use with the present invention.
Figure 11B:
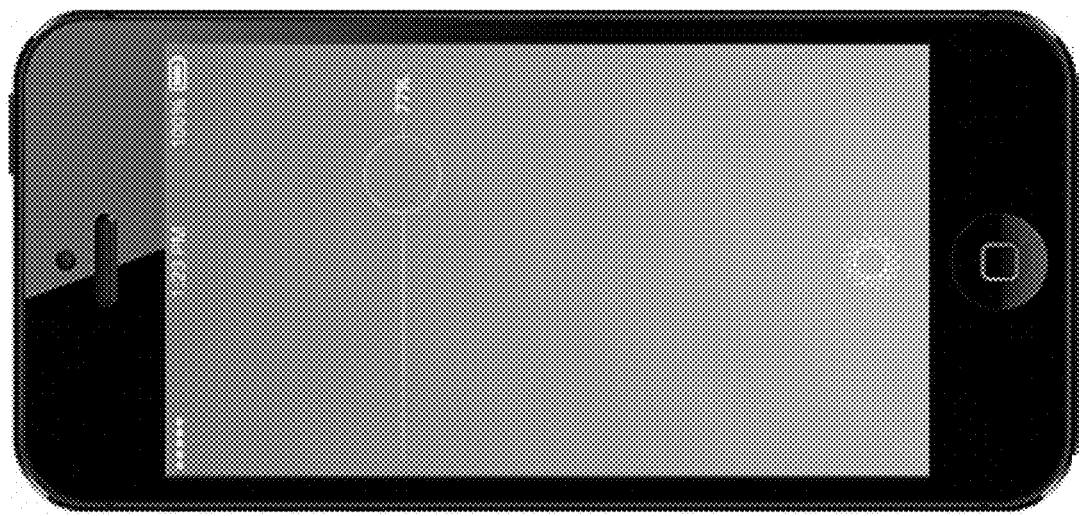
Figure 11C:
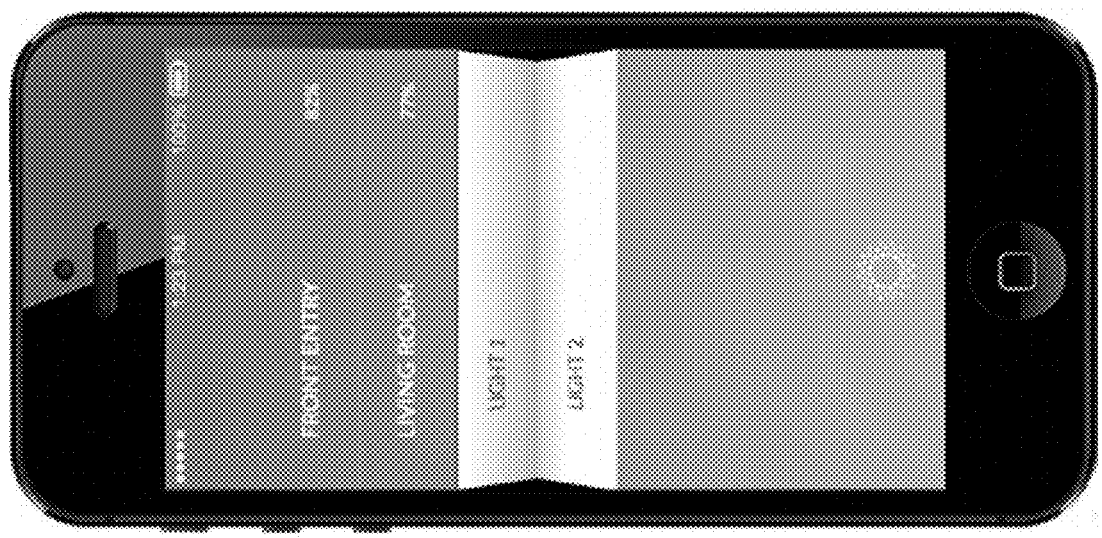
Figure 11D:
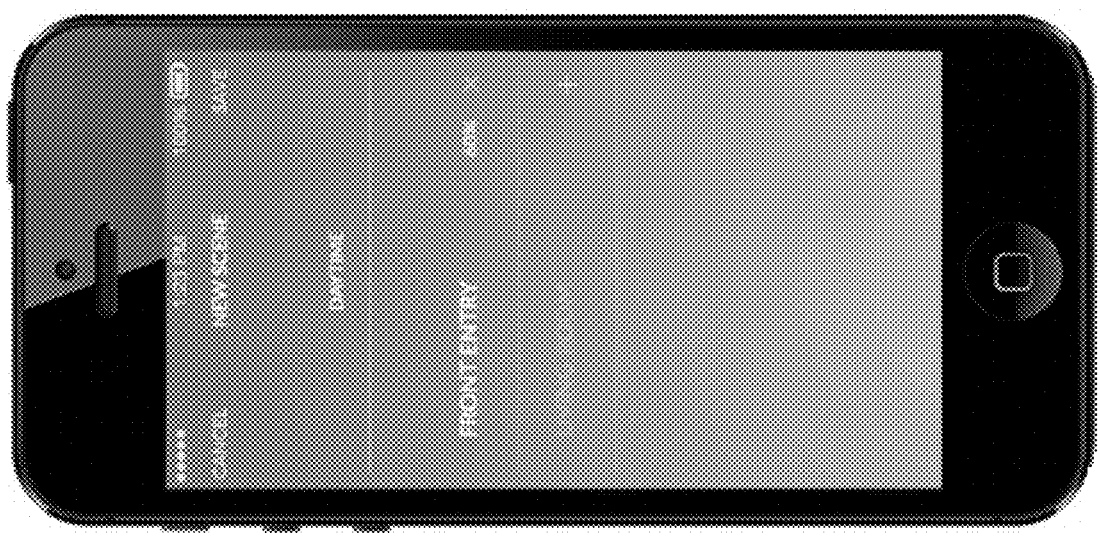
Figure 11E:
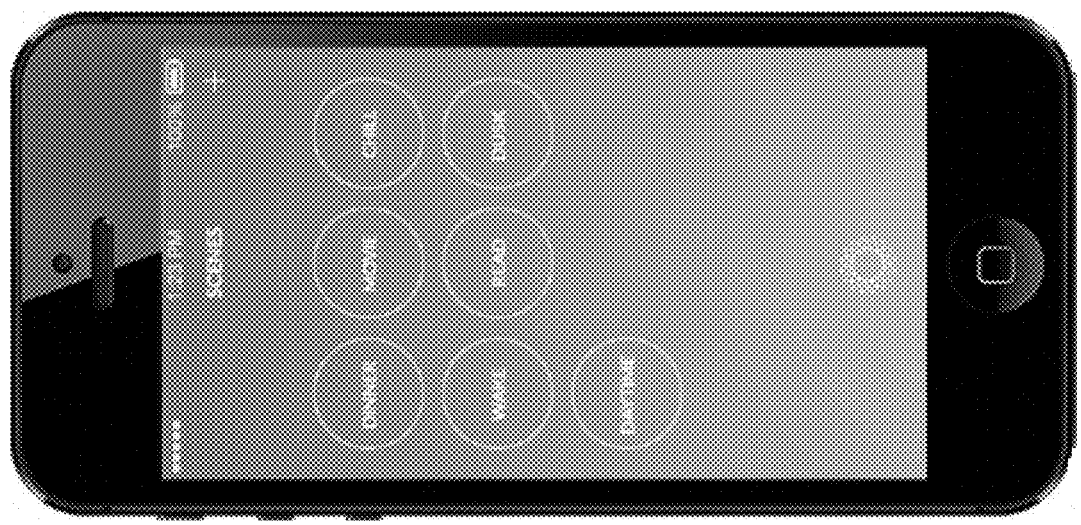
Figure 11F:
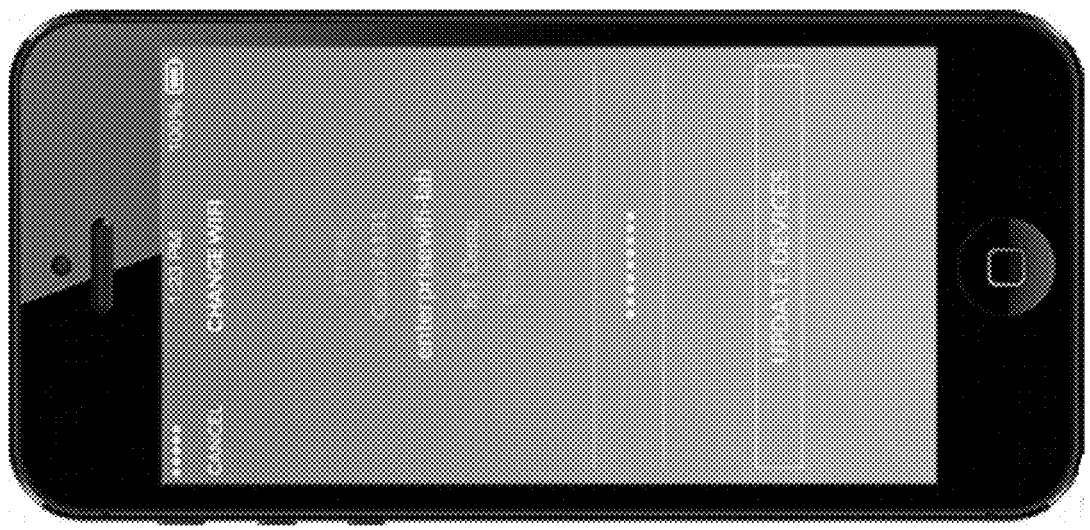

According to one embodiment, the control logic 600 is carried out using a computing device having a computer architecture according to that described in FIG. 10.

Figure 7:
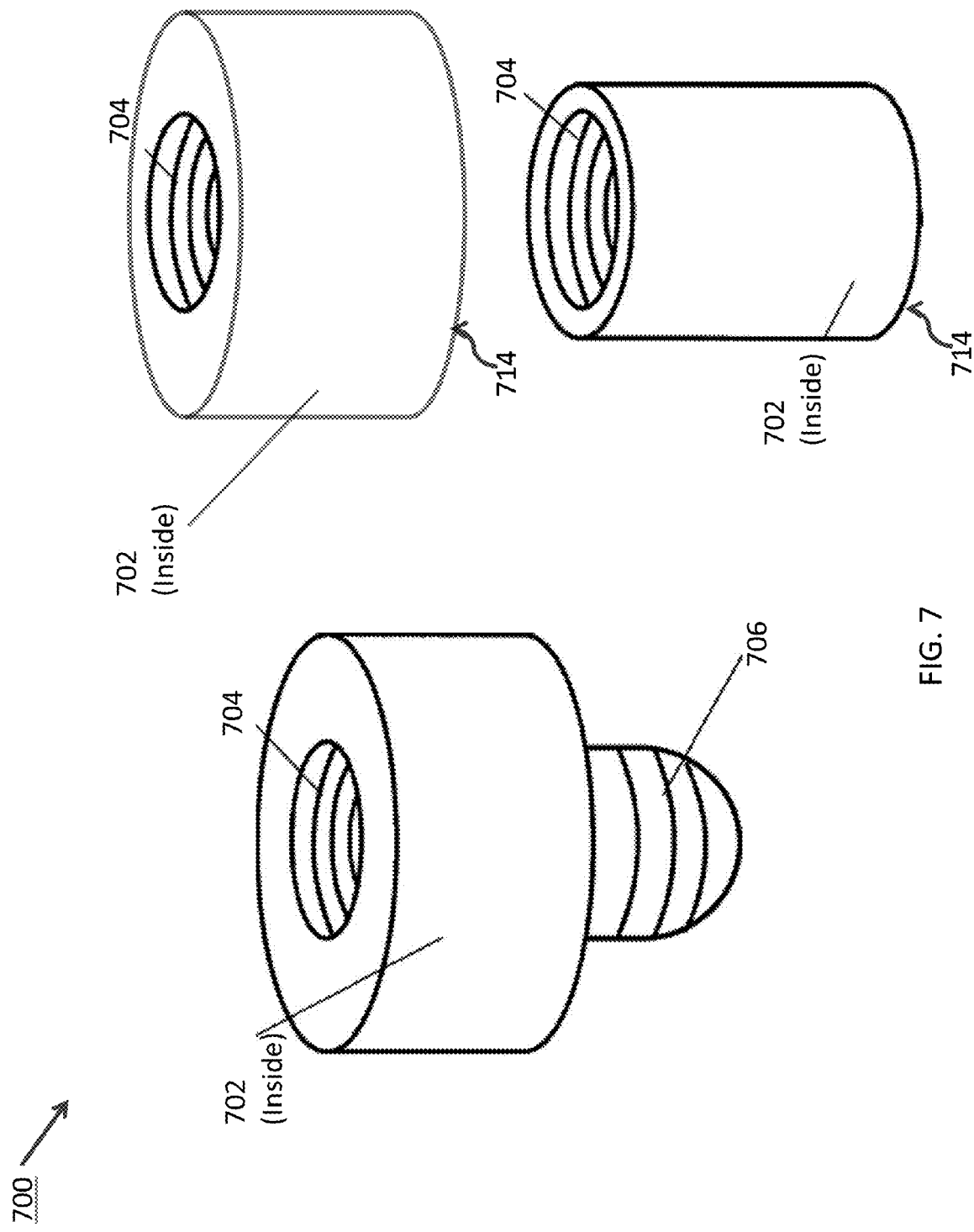
FIG. 7 illustrates an adapter module according to an exemplary embodiment of the present invention.

FIG. 7 illustrates an adapter module 700 according to an exemplary embodiment of the present invention.

In FIG. 7, an adapter module 700 (sometimes referred to as a smart socket) includes a female end 704 of a light socket joint. The female end 704 is designed to accept a light bulb (CFL, LED, Halogen, Incandescent, or any other type of lighting), and can be designed to accept various types and sizes of light bulbs.

According to one embodiment, adapter module 700 incorporates a male end 706 of a light socket joint. The male end 706 is designed to be placed into an existing light socket joint.

According to one embodiment, adapter module 700 incorporates an electrical wire feed through element 714 so that it may be installed directly as part of a lighting assembly.

The adapter module 700 can have various dimensions depending on the size of lighting fixture to be adapted. Adapter module includes various internal circuitry 702 as discussed further herein, that may include a power supply, a microcontroller, a power control module, and a transceiver.

Figure 8:
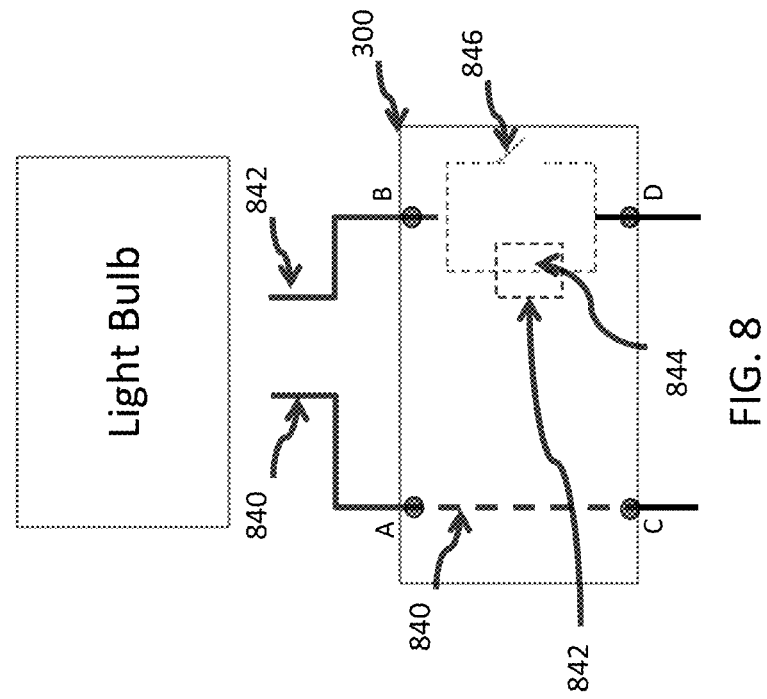
FIG. 8 illustrates an adapter module according to an exemplary embodiment of the present invention.

FIG. 8 illustrates an adapter module 800 according to an exemplary embodiment of the present invention.

In FIG. 8, adapter module 800 is connected to the light bulb at terminals A, B, C and D. That is, line 840 is connected to adapter module 800 at terminal A and terminal C, while line 842 is connected to adapter module 800 at terminal B and terminal D.

In FIG. 8, the hashed lines are internal circuitry within adapter module 800. Hashed line 840, for example, is internal circuitry that connects terminals A and C. Adapter module 800 comprises logic circuit 842 having a logic switch 844 both of which are connected in parallel with manual switch 846.

When adapter module 800 receives instructions via its Wifi or Bluetooth circuitry (not shown) to enable, disable, increase, decrease power to the light bulb, logic circuit 842 closes the logic switch 844 to execute the instructions. On the other hand, if switch 846 is actuated by a user, line 842 is closed to trigger power supply to the light bulb to adjust the lighting. A skilled artisan will realize that this is but one exemplary technique for using adapter module 800 to control the light bulb.

Adapter module 800 might use a combination of line 840 and 842 in FIG. 8 and draw power from an AC outlet as a primary source of power. Adapter module 800 can include an internal converter to convert the supplied voltage to what is required to power the light bulb.

Figure 9:
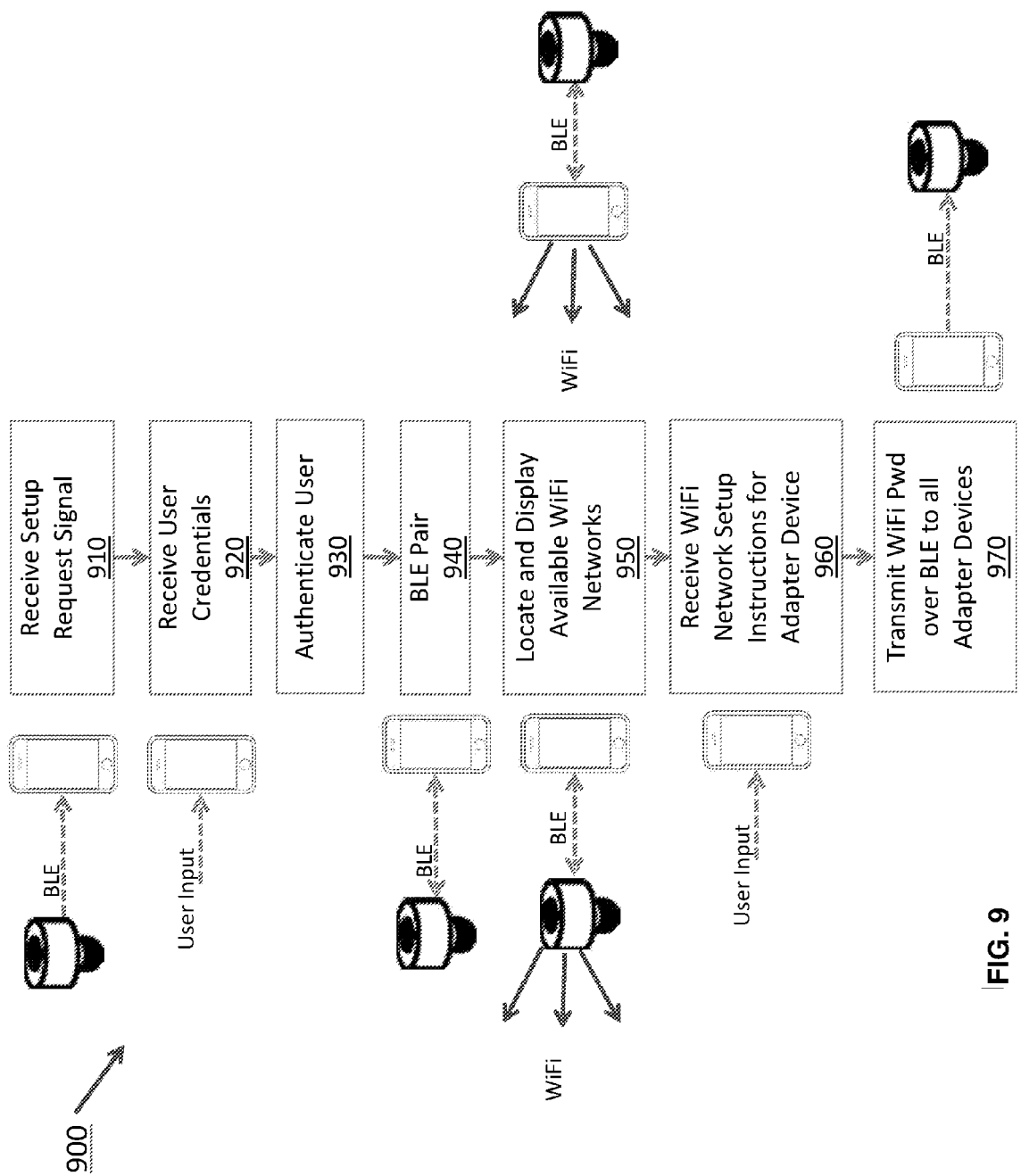
FIG. 9 illustrates a home lighting system setup process according to an exemplary embodiment of the present invention.

FIG. 9 illustrates a home lighting system setup process 900 according to an exemplary embodiment of the present invention.

In FIG. 9, a mobile device within range of a light socket adapter module receives a setup request signal 910 via Bluetooth LE. An application stored on the mobile device prompts a user of the mobile device to enter credentials to be authenticated as part of a login process, the user enters his or her credentials 920 and the application authenticates the user 930. It will be appreciated that authentication can be accomplished according to any known and appropriate algorithm without departing from the scope of the present invention.

Upon authentication of the user, the mobile device and light socket adapter module pair via Bluetooth LE 940. The light socket adapter module scans and locates all available WiFi networks, transmits the information about them to the mobile device via Bluetooth LE, and mobile device displays them 950 to the user. The user enters instructions for a desired WiFi network 960, including any network authentication that is necessary. In this manner, the user selects the WiFi network the light socket adapter module will be connected to. Finally, the mobile device transmits the WiFi password to all of the light socket adapter modules 970 within a defined proximity.

In an alternative embodiment, step 950 involves the mobile device scanning for available WiFi networks and displaying them 950 to the user. This is an alternative to using the light socket adapter module to scan for available WiFi networks.

According to one embodiment, the process 900 is carried out using a computing device having a computer architecture according to that described in FIG. 10.

It will be appreciated that the setup process 900 depicted in FIG. 9 can be accomplished using any combination of computing devices, applications, or websites associated with the present system.

An exemplary provisioning process that accompanies the process 900 depicted in FIG. 9 is as follows. The factory state of a light socket adapter module is [0x01, x01, 0x01] [Network Disconnected, Unprovisioned, Cloud Disconnected]. In step 910, the light socket adapter module state transitions to [0x02, 0x01, 0x01] [Network Connecting, Unprovisioned, Cloud Disconnected]. After the light socket adapter module has connected to WiFi in step 950, the state transitions to [0x03, 0x02, 0x01] [Network Connected, Provisioning, Cloud Disconnected] and the adapter module attempts to provision itself with the cloud. Once the light socket adapter module has received a messaging service channel name and API token in step 970, the state transitions to [0x03, 0x03, 0x02] [Network Connected, Provisioned, Cloud Connecting]. Finally, when the connection to the messaging service has completed, the state transitions to [0x03, 0x03, 0x03] [Network Connected, Provisioned, Cloud Connected] and the light socket adapter module is ready to process incoming messages.

According to one embodiment, the exemplary provisioning process described above is implemented using a messaging service similar to that provided by PubNub®. It will be appreciated that messaging services having capabilities for implementing the process described above can be used without departing from the scope of the invention.

The exemplary provisioning process described above is implemented, according to one embodiment, utilizing at least the following characteristics of Bluetooth LE.

API Device ID Characteristic:
   Read/Write: WRITE ONLY
   Security: If adapter device has been provisioned, the characteristic is SECURED. Otherwise, the characteristic is UNSECURED.
   Description: Used to specify the Device API ID to use when provisioning the adapter device with the API.

WiFi Params Passphrase Characteristic:
   Read/Write: WRITE ONLY
   Security: If adapter device has been provisioned, the characteristic is SECURED. Otherwise, the characteristic is UNSECURED.
   Description: Used to specify the Passphrase used to connect to WPA and WEP WiFi networks.

WiFi Params SSID Characteristic:
   Read/Write: WRITE ONLY
   Security: If adapter device has been provisioned, the characteristic is SECURED. Otherwise, the characteristic is UNSECURED.
   Description: Used to specify the SSID to use when connecting to WiFi. After writing to this characteristic, a WiFi scan begins.

Light socket adapter modules according to the present disclosure can be secured through an exemplary mechanism whereby access to specific device functionality can be restricted based on an identity of a user. This exemplary mechanism is active even in the event that the adapter module does not have an active network connection.

An exemplary security mechanism to accompany a light socket adapter module (or device) having gone through the process 900 depicted in FIG. 9 is as follows. After the adapter module has been provisioned (added to a user's account), secured device characteristics require authentication to ensure the user making a request has appropriate access for such a request.

Before attempting to access a SECURED BLE Characteristic, an adapter module requests an access token from the remote server system (104 in FIG. 1) providing access to only the specified adapter module. The remote server system authenticates the requestor, validating that they are authorized to access the adapter module before providing the access token. The access token comprises a nonce and a signature.

Next, the adapter module writes the nonce and signature components into an Authenticate Central BLE Characteristic. The adapter module signs the nonce using the API token that it received from the remote server system during the Provisioning process. The adapter module then compares the nonce with the provided signature and confirms that they match. If the provided access token components are correct then the adapter module allows access to SECURED Characteristics for the remainder of the connection. It will be appreciated that authentication can remain active only during the life of a single BLE connection. New connections can be re-authenticated.

FIG. 10 illustrates an exemplary computer architecture 1000 for use with an exemplary embodiment of the present invention.

The present invention comprises various computing entities that may have an architecture according to exemplary architecture 1000. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Architecture 1000 may also include a read only memory (ROM) and/or other static storage device 1026 coupled to bus 1020 for storing static information and instructions used by processor 1010.

A data storage device 1025 such as a magnetic disk or optical disc and its corresponding drive may also be coupled to architecture 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 allows for access to other computers (e.g., servers or clients) via a network. The communication device 1040 may comprise one or more modems, network interface cards, wireless network interfaces or other interface devices, such as those used for coupling to Bluetooth, Ethernet, token ring, or other types of networks.

FIGS. 11A-11F illustrate exemplary user interfaces for use with the present invention.

According to various embodiments, an adapter module as described herein can be updated via WiFi or Bluetooth LE or any other wireless standard (e.g., upgrades, patches, fixes, etc.).

An adapter module according to the present invention can further include circuitry for measuring power consumption. This can include implementations involving solar or other photo voltaic cells, or basic inductive coils. The available measurements, as examples only, include measuring current flow to calculate power usage, and relative energy savings based on a maximum setting vs. user setting.

According to one embodiment, an adapter module described herein automatically detects the type of light bulb engaged in the socket. Detection includes but is not limited to an implementation involving a photovoltaic or solar cell, a single pulse from a cold start, testing for resistance, inductance, capacitance, or testing for dim ability. The adapter module can also calibrate a light bulb to determine an optimal dimming profile.

According to one embodiment, an adapter module described herein monitors bulb or other equipment temperature and modifies power to the bulb accordingly. Monitoring of temperature can be accomplished via an internal or external sensor, or a combination of both. If a temperature of a bulb has exceeded a threshold, the power to the bulb may be turned down slightly or completely to either dim or turn off the bulb until the temperature returns to an acceptable level.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A lighting adapter module, comprising:
   a first connection to a source of power;
   a second connection to provide power to a lighting source;
   Wi-Fi transmit/receive circuitry;
   Bluetooth LE transmit/receive circuitry;
   a processor that processes instructions received via one or more of the Wi-Fi transmit/receive circuitry and the Bluetooth LE transmit/receive circuitry, wherein the instructions are received from one or more of a remote server system and a mobile computing device;
   wherein the processor executes first instructions to cause the lighting adapter module to detect devices within a detection proximity of the lighting adapter module, wherein the devices are enabled with one or more of Bluetooth LE and Wi-Fi;
   wherein a detected device is associated with a particular user identity, the particular user identity associated with a set of user preferences; and
   power supply control circuitry controllable by the processor, wherein the power supply control circuitry controls power supplied to the lighting source;
   wherein the processor, in response to detection of the device and determination of the particular user identity, automatically processes second instructions to modify the power supplied to the lighting source based at least on the set of user preferences;
   wherein communicating with the enabled device occurs initially over one of Bluetooth LE or Wi-Fi.

2. The lighting adapter module according to claim 1, wherein the lighting adapter module receives a connection request from the enabled device via Bluetooth LE.

3. The lighting adapter module according to claim 1, wherein the lighting adapter module receives a connection request from the enabled device via Wi-Fi.

4. The lighting adapter module according to claim 1, wherein the second instructions include one or more of disable power to the lighting source, enable power to the lighting source, reduce power to the lighting source to produce a dimming effect, and increase power to the lighting source to increase brightness.

5. The lighting adapter module according to claim 1, wherein the Wi-Fi transmit/receive circuitry is periodically disabled to save power.

6. The lighting adapter module according to claim 1, wherein the lighting source is one of CFL, LED, Halogen, or Incandescent.

7. The lighting adapter module according to claim 1, wherein the second instructions are further based on one or more of motion sensor data and light sensor data.

8. The lighting adapter module according to claim 1, wherein authentication of a device comprises:
   transmitting, by the lighting adapter module, a request for an access token to a remote server system;
   receiving, by the lighting adapter module, the access token from the remote server system, wherein the remote server system authenticates the device prior to providing the access token, and wherein the access token comprises a nonce and a signature;
   writing, by the lighting adapter module, the nonce and signature into an authentication characteristic;
   signing, by the lighting adapter module, the nonce using an API token received from the remote server system to produce a signed nonce;
   comparing, by the lighting adapter module, the signed nonce to the signature; and
   accessing, by the lighting adapter module, secured characteristics upon determining that the signed nonce and signature match.

9. The lighting adapter module according to claim 1, further comprising power consumption monitoring circuitry.

10. The lighting adapter module according to claim 1, wherein the lighting adapter module automatically detects the type of the lighting source.

11. The lighting adapter module according to claim 1, wherein the lighting adapter module calibrates the lighting source to determine an optimal dimming profile for the lighting source.

* * * * *